United States Patent [19]

Kraus

[11] 4,412,019

[45] Oct. 25, 1983

[54] ASPHALT COMPOSITIONS

[75] Inventor: Gerard Kraus, Bartlesville, Okla.

[73] Assignee: Phillips Petroleum Company, Bartlesville, Okla.

[21] Appl. No.: 397,319

[22] Filed: Jul. 12, 1980

[51] Int. Cl.³ .............................................. C08L 95/00
[52] U.S. Cl. ...................................... 524/71; 524/66; 524/67; 524/68
[58] Field of Search ....................... 524/71, 68, 67, 66

[56] References Cited

U.S. PATENT DOCUMENTS

| | | | |
|---|---|---|---|
| 3,803,066 | 4/1974 | Petrossi | 260/28.5 AS |
| 4,130,516 | 12/1978 | Gagle et al. | 260/28.5 AS |
| 4,145,322 | 3/1979 | Maldonado | 260/28.5 AS |

*Primary Examiner*—Melvyn L. Marquis

[57] ABSTRACT

This invention relates to asphalt composition exhibiting improved physical properties comprising asphalt, hydrogenated rubber copolymer and sulfur which compositions exhibit improved temperature viscosity stability and improved tensile properties.

12 Claims, No Drawings

ASPHALT COMPOSITIONS

The present invention relates to asphalt compositions exhibiting improved physical properties. In accordance with another aspect, this invention relates to asphalt compositions containing rubber and sulfur useful in paving and roofing compositions. In accordance with a further aspect, this invention relates to asphalt-rubber compositions containing a high percentage or large quantities of sulfur which compositions exhibit improved physical properties. In accordance with a further aspect, this invention relates to a process for making such asphalt compositions.

BACKGROUND OF THE INVENTION

It has been known for many years that asphaltic (bituminous) compositions containing up to 10 percent by weight of rubber and up to 10 percent by weight of sulfur can be prepared. While these compositions containing natural or synthetic alkadiene homo- or copolymers still having olefinic double bonds possess desirable properties, they also show an undesirable effect when held at elevated temperatures over a prolonged period of time. For instance in a commercial paving operation, an increase in viscosity occurs owing to the crosslinking of the unsaturated rubber with the sulfur.

It has been discovered according to this invention that this increase in viscosity, which is undesirable for many paving and coating operations, can be eliminated by employing hydrogenated, saturated diene-vinylarene copolymers as the elastomer component. Because of the essential absence of crosslinking reactions between sulfur and hydrogenated diene-vinylarene copolymers, such rubberized asphalt compositions can be loaded with much higher sulfur levels than have been previously reported, resulting in improved physical properties.

Accordingly, an object of this invention is to provide asphalt compositions exhibiting improved physical properties.

A further object of this invention is to provide asphalt compositions that can be readily prepared resulting in products having improved physical properties.

A further object of this invention is to provide asphalt compositions having improved high temperature viscosity stability and improved tensile properties.

Other objects, aspects as well as the several advantages of the invention will be apparent to those skilled in the art upon reading the specification and the appended claims.

SUMMARY OF INVENTION

In accordance with the invention it has been found that by incorporating hydrogenated rubbers into asphalt-sulfur compositions that larger quantities of sulfur can be employed in the compositions and at the same time improve the physical properties with respect to high temperature viscosity stability and tensile strength.

More specifically, in accordance with the invention, in paving compositions comprising asphalt, rubber and sulfur, the invention comprises using hydrogenated rubber, e.g. butadiene-styrene copolymer, plus large quantities of sulfur ranging up to about 40 weight percent to produce compositions having improved high temperature viscosity stability and improved tensile properties.

DETAILED DESCRIPTION OF INVENTION

The asphalt employed in this invention can be any of the well known bituminous substances derived from petroleum, shale oil, coal tar and the like. Commonly, the asphalt is prepared by vacuum distillation of a topped crude oil. Preferably the asphalt has penetration at 25° C. (as determined by ASTM D5) ranging for about 20 to 300, more preferably ranging from 80 to 200.

The rubbery polymers of the present invention can be prepared by any of the conventional techniques known in the art. For example, in preparation of copolymers used according to the invention, a mixture of conjugated diene and a mono-vinylarene monomer can be polymerized using an organometallic catalyst system. The hydrogenation of the rubbery polymers of the invention can be carried out in any manner known in the art. For example, copolymers of the invention can be hydrogenated over suitable catalysts, e.g. nickel, kieselguhr, and the like. The hydrogenated copolymers of the present invention are polymers which have been sufficiently hydrogenated to remove substantially all of the olefinic unsaturation leaving only the aromatic i.e. phenyl group unsaturation. The extent of hydrogenation of the olefinic bonds and of the phenyl groups in the polymers can be determined by infra-red analysis before and after hydrogenation.

The hydrogenated diene-vinylarene copolymer employed in this invention can be prepared by hydrogenating a copolymer of a conjugated diene, such as 1,3-butadiene, isoprene, 2,3-dimethyl-1,3-butadiene and the like, and a vinylarene, such as styrene, alpha-methylstyrene, o-, m-, or p-vinyl-toluene and the like.

Preferred hydrogenated diene-vinylarene copolymers are thermoplastic hydrogenated isoprene-styrene or butadiene-styrene random or block copolymers, such as those described in U.S. Pat. Nos. 4,116,917; 3,823,203 and 3,554,911, all herein incorporated by reference. The presently most preferred copolymers are hydrogenated, substantially linear or radial teleblock butadiene-styrene copolymers such as those obtained by hydrogenating polymers described in U.S. Pat. Nos. 3,281,383 and 3,639,521, herein incorporated by reference. Similar hydrogenated butadiene-styrene copolymers are those marketed by Shell Oil Company in Houston under its trademark Kraton® such as Kraton® G-1650. Preferred butadiene:styrene weight ratios range from about 50:50 to about 90:10, more preferably from 60:40 to 80:20.

The sulfur employed in this invention can be derived by mining of underground deposits, e.g., the Frasch process; or extracted from crude oil, shale oil, coal tar and the like; or prepared from hydrogen sulfide present in sour natural gas or refinery gas; or prepared from metallic sulfide ores, e.g., by the Noranda process.

The inventive compositions comprising asphalt, hydrogenated diene-vinylarene copolymer, and sulfur generally have the following composition; about 40–95 parts by weight, preferably about 50–75 part by weight, of asphalt; about 5–20 parts by weight, preferably about 8–14 parts by weight, of hydrogenated diene-vinylarene copolymer; about 1–40 parts by weight, preferably 10–30 parts by weight, of sulfur.

The amounts of asphalt, hydrogenated rubber and sulfur used according to the invention can vary appreciably as will be understood by those skilled in the art. The amount can vary depending upon the quality of the materials being used and the techniques of preparing the composition.

The compositions of the invention can be used to advantage in a number of industrial applications. For example, paving compositions, roofing composition and the like.

The inventive asphalt blends can be prepared by any suitable mixing means in any order, at a temperature at which easy homogenizing is accomplished. Preferably, an asphalt-hydrogenated rubber mixture is prepared at high mixing speeds, at a temperature of about 200°-210° C. Subsequently, the sulfur is stirred in at lower mixing speeds at a temperature of about 150°-160° C.

The following examples are intended to further illustrate this invention. However, particular materials, ratios and procedures should be considered exemplary and not limitive of the reasonable scope of this invention.

EXAMPLE I

In this example the effect of increasing amounts of sulfur on a blend of asphalt and hydrogenated butadiene/styrene copolymer is described. Materials used were:

(1) A propane extraction process asphalt from Phillips Petroleum Company's Kansas City, Kans. refinery, containing about 4.2 weight percent of asphaltenes and having a penetration of 118 at 25° C. (according to ASTM D5), and a Ring and Ball softening point of 47.5 (according to ASTM D36-76).

(2) Solprene® 512, a substantially linear butadiene/styrene teleblock polymer coupled with an epoxidized soybean oil, having a bound styrene content of about 30 percent by weight, a molecular weight $M_n$ of about 70,000, a vinyl content before hydrogenation of about 29% (determined by IR absorption at 11.0 microns), a residual unsaturation of less than 1% (based on butadiene; determined by IR absorption at 10.35 microns), and an inherent viscosity of about 0.7. (determined with a Medalia viscometer using a screened solution of 0.2 grams of the copolymer in 100 ml of toluene), and (3) ground sulfur.

The mixing procedure was as follows: asphalt and hydrogenated butadiene/styrene copolymer (Solprene 512) were blended with a motor-driven paddle stirrer at about 1700 r.p.m. for 60–80 minutes, at a temperature of 200°–205° C. Then sulfur powder was added, and the mixture was stirred at about 184 r.p.m. for 15 minutes, at a temperature of 155°–160° C.

Properties of prepared blends are listed in Table I.

TABLE I

| | | Run 1 (Control) | Run 2 (Invention) | Run 3 (Invention) | Run 4 (Invention) |
|---|---|---|---|---|---|
| A. | Composition | | | | |
| | Asphalt[1], parts by weight | 86 | 81 | 76 | 66 |
| | Hydrogenated Rubber[2], parts by weight | 14 | 14 | 14 | 14 |
| | Sulfur, parts by weight | 0 | 5 | 10 | 20 |
| B. | Properties: | | | | |
| | Penetration[3], mm. | 28 | 30 | 28 | 19 |
| | 300% Modulus at −10° C.[4], MPa | 4.5 | 3.7 | 3.9 | 5.7 |
| | Tensile at Break at −10° C.[4], MPa | —[5] | —[5] | —[5] | —[5] |
| | Elongation at −10° C.[4], % | over 300 | over 300 | over 300 | over 300 |

[1]Kansas City asphalt (see earlier description in this example);
[2]Solprene 512 (see earlier description in this example);
[3]determined according to ASTM D5 a 25° C.;
[4]determined on a Model TM Instron tensile tester with a $CO_2$ cooled environment chamber (Model 3111); tensile specimens were molded at 110° C. for 2 minutes, had a length of 5.08 cm and a cross-section of 0.635 cm × 0.152 cm, and were extended at a rate of 2.54 cm per minutes;
[5]could not be determined because the maximum extension of the Instron tester in the environment chamber was 300%.

Data in Table I show that large amounts of inexpensive sulfur (levels up to 20 percent by weight; Run 4) could be incorporated in blends of asphalt and hydrogenated rubber without causing any significant deterioration of important physical properties (modulus, penetration).

EXAMPLE II

This example is a duplicate of Example 1, except that a straight-run asphalt from Sunray DX Company's Tulsa, Okla., refinery (marketed by Sun Oil Company) having a penetration at 25° C. of 94–98, a Ring and Ball softening point of 44, and an asphaltene content of 14.3 was employed. Data in Table II show that the yield strength of inventive compositions in Runs 6 and 7 increased at exceptionally high sulfur levels of up to 30 weight percent, while the elongation was drastically lowered by the addition of 30 percent by weight of sulfur.

TABLE II

| | | Run 5 (Control) | Run 6 (Invention) | Run 7 (Invention) |
|---|---|---|---|---|
| A. | Composition: | | | |
| | Asphalt[1], parts by weight | 85 | 76 | 56 |
| | Hydrogenated Rubber[2], parts by weight | 14 | 14 | 14 |
| | Sulfur, parts by weight | 1 | 10 | 30 |
| B. | Properties: | | | |
| | Tensile at yield at −10° C.[3], MPa | 3.13 | 3.23 | 4.67 |
| | Tensile at Break at −10° C.[3], MPa | — | — | 3.06 |
| | 300% Modulus at −10° C.[3], MPa | 2.47 | 2.37 | — |
| | Elongation at −10° C.[3], % | over 300 | over 300 | 47 |

[1]Sunray DX (see earlier description in this Example II)
[2]Solprene 512 (see earlier description in Example I)
[3]See Footnotes 4 of Table 1.

EXAMPLE III

In this example the effect of increasing levels of hydrogenated butadiene/styrene copolymer (Solprene 512) in asphalt blends of constant sulfur levels (20 weight percent) is described. Blends were prepared according to the procedure described in Example I. Composition and properties of inventive blends are listed in Table III.

TABLE III

|  | Run 8 (Control) | Run 9 (Invention) | Run 10 (Invention) |
|---|---|---|---|
| A. Composition: |  |  |  |
| Asphalt[2], parts by weight | 80 | 72 | 66 |
| Hydrogenated Rubber[1], parts by weight | 0 | 8 | 14 |
| Sulfur, parts by weight | 20 | 20 | 20 |
| B. Properties: |  |  |  |
| Penetration[1], mm | 110 | 29 | 19 |
| Tensile at Break at $-10°$ C.[1], MPa | 1.16 | 2.21 | 2.38 |
| Elongation at $-10°$ C.[1], % | less than 2 | 31 | 285 |

[1]See Footnotes to Table I
[2]Sunray DX (see Example II for detailed description)

Data in Table III show that at a constant high sulfur loading of 20 percent by weight, the benefits of adding hydrogenated rubber on important performance parameters of asphalt are: higher elongation and higher tensile strength at low temperature ($-10°$ C.) and lower penetration.

EXAMPLE IV

In this example the advantage of using a hydrogenated butadiene/styrene copolymer versus an unsaturated butadiene/styrene copolymer in asphalt/rubber/sulfur blends is demonstrated. Blends were prepared according to the procedure described in Example I and tested in Brookfield RVT-E rotary viscometer at 155° C. after various time periods at this temperature.

Viscosities determined from measured torques are listed in Table IV.

TABLE IV

|  | Run 11 (Control) | Run 12 (Control) | Run 13 (Invention) | Run 14 (Invention) | Run 15 (Invention) |
|---|---|---|---|---|---|
| A. Composition: |  |  |  |  |  |
| Asphalt[1], parts by weight | 85 | 76 | 85 | 76 | 56 |
| Unsaturated Rubber[2], parts by weight | 14 | 14 | — | — | — |
| Hydrogenated Rubber[3], parts by weight | — | — | 14 | 14 | 14 |
| Sulfur, parts by weight | 1 | 10 | 1 | 10 | 30 |
| B. Viscosity (Poise 155° C.) |  |  |  |  |  |
| after 5 minutes | — | — | — | 109 | 41 |
| after 9 minutes | — | 1752 | — | — | — |
| after 10 minutes | — | 2172 | 148 | 95 | 50 |
| after 14 minutes | — | 4630 | — | — | 43 |
| after 20 minutes | 375 | — | 148 | 94 | 42 |
| after 25 minutes | 685 | — | — | — | — |
| after 30 minutes | 834 | — | 152 | 94 | 41 |
| after 40 minutes | — | — | — | 95 | 32 |
| after 42 minutes | 1212 | — | — | — | — |
| after 50 minutes | 2276 | — | — | 97 | — |
| after 57 minutes | 3580 | — | — | — | — |
| after 60 minutes | — | — | 152 | — | — |
| after 80 minutes | — | — | — | 98 | 25 |
| after 120 minutes | — | — | 156 | 102 | 30 |
| after 170 minutes | — | — | 158 | — | 28 |
| after 240 minutes | — | — | 161 | — | — |

[1]Sunray DX asphalt (see Example II for detailed description)
[2]Solprene 416, an unsaturated, radial butadiene/styrene block copolymer having a bound styrene content of about 30 weight percent, a molecular weight $M_n$ of about 110,000, a vinyl content of about 11% and an inherent viscosity of about 0.92.
[3]Solprene 512 (see Example I for detailed description).

Data in Table IV clearly show that the viscosity of asphalt blends with unsaturated rubber (Control Runs 11, 12) exhibit a dramatic increase in viscosity within less than 1 hour at 155° C., most likely due to crosslinking of rubber with sulfur, whereas compositions comprising saturated (hydrogenated) rubber (Invention Runs 13, 14, 15) undergo only insignificant changes in viscosity after 2 to 4 hours at 155° C. These data demonstrate the superiority of hydrogenated butadiene/styrene copolymers over unsaturated butadiene/styrene copolymers as additives to asphalt-sulfur blends, especially at high sulfur levels of 10 percent by weight or higher.

I claim:
1. Asphalt-rubber-sulfur compositions of improved physical properties comprising:
   (a) about 40–95 parts by weight of asphalt,
   (b) about 5–20 parts by weight of a hydrogenated synthetic diene rubber, and
   (c) about 1–40 parts by weight of sulfur.
2. A composition according to claim 1 wherein
   (a) ranges from about 50 to 75 parts by weight,
   (b) ranges from about 8 to 14 parts by weight, and
   (c) ranges from about 10 to 30 parts by weight.
3. A composition according to claim 1 wherein (b) is a hydrogenated butadiene/styrene copolymer.
4. A composition according to claim 1 where in (b) is a hydrogenated butadiene/styrene block copolymer and
   (a) ranges from about 50 to 75 parts,
   (b) ranges from about 8 to 14 parts by weight; and
   (c) ranges from about 10 to 30 parts by weight.
5. A composition according to claim 4 wherein said hydrogenated copolymer has a bound styrene content of about 20 to 40 percent by weight.
6. A composition according to claim 4 wherein said hydrogenated copolymer has a bound styrene content of about 30 percent by weight and a molecular weight of about 70,000.
7. A process for obtaining asphalt-rubber-sulfur compositions of improved physical properties including improved high temperature viscosity stability and improved tensile properties which comprises hot-blending about 40–95 parts by weight of asphalt, about 5–20 weight parts of a hydrogenated rubber and about 1–40 parts by weight of sulfur.
8. A process according to claim 7 wherein the asphalt and hydrogenated rubber are combined first at an elevated temperature then blended with the sulfur at a lower blending temperature.
9. A process according to claim 8 wherein the asphalt and rubber are combined at a temperature in the range of about 200°–210° C. and the sulfur is blended with asphalt-rubber mixture at a temperature of about 150°–160° C.
10. A process according to claim 9 wherein rubber is a hydrogenated butadiene/styrene copolymer.
11. A process according to claim 9 wherein the amount of asphalt present ranges from about 50–75 parts by weight, said rubber ranges from about 8–14 parts by weight, and said sulfur ranges from about 10–30 parts by weight.
12. A process according to claim 11 wherein said rubber is a hydrogenated butadiene/styrene copolymer.

* * * * *